April 3, 1962 M. SCHNUR ET AL 3,028,070
UNITARY CONTAINER AND TAB AND METHOD OF FORMING SAME
Filed Feb. 6, 1958 2 Sheets-Sheet 1
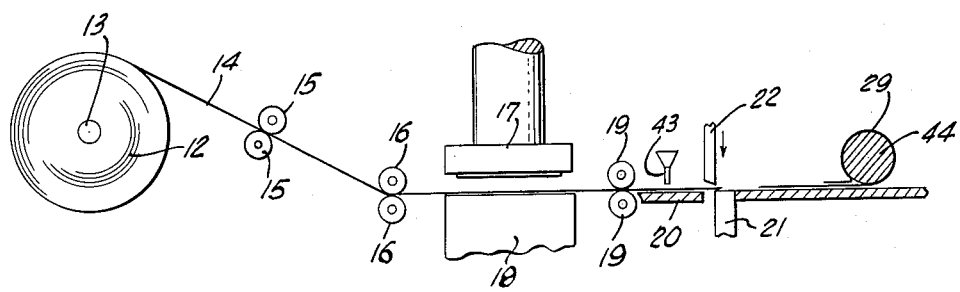
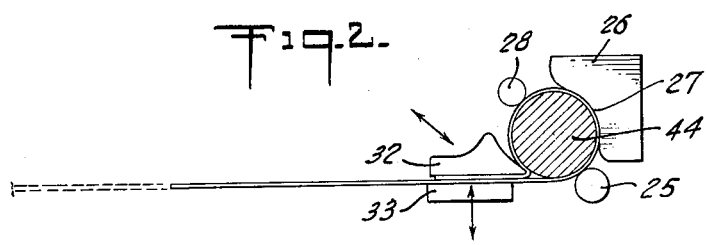
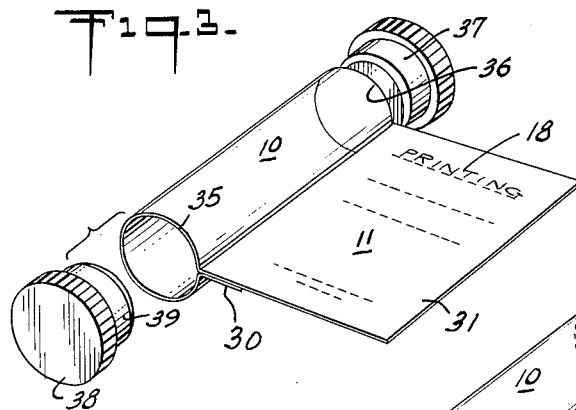
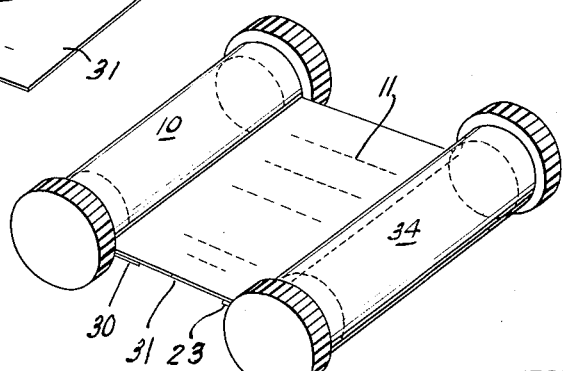
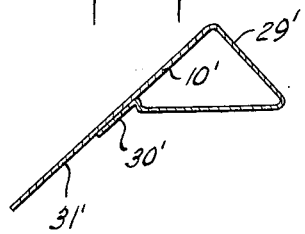
INVENTORS:
M. SCHNUR
M. APPEL
BY
ATTORNEY

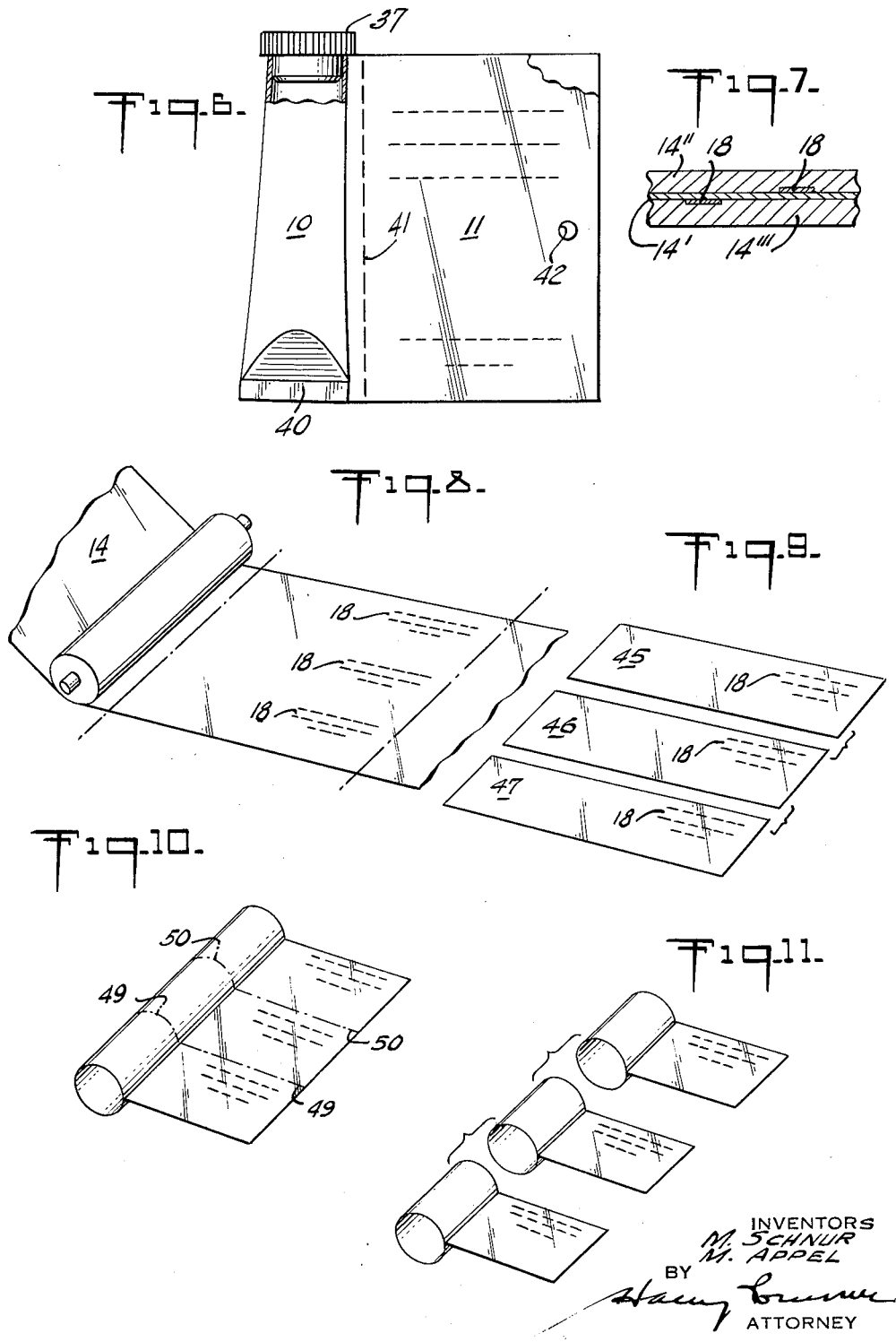

United States Patent Office

3,028,070
Patented Apr. 3, 1962

3,028,070
UNITARY CONTAINER AND TAB AND METHOD OF FORMING SAME
Martin Schnur, West Orange, and Mel Appel, East Orange, N.J. (both % Schnur-Appel, 2165 Morris Ave., Union, N.J.)
Filed Feb. 6, 1958, Ser. No. 713,588
3 Claims. (Cl. 229—74)

This invention relates to a unitary container and tab of plastic or other suitable material, of novel structural features and formed in a novel manner, providing an economical package adapted for short run as well as for high volume production, with the use of inexpensive equipment and readily available materials.

A further object of the invention is to provide a tubular package or container which can be made from flat sheet plastic material.

A further object is to provide such a package which is adapted to be printed in flat sheet form and thereafter fabricated into a tubular form in such a manner as to provide a tab or flap or flaps of plastic material which may be printed with indicia such as a pictorial design and/or promotional and descriptive text.

The invention comprises a tubular package or container adapted to be fabricated or formed from flat sheet plastic material. The container can be made singly from individual plastic sheets of appropriate size, in multiple from strips of appropriate width which, after forming, are cut to desired length, or in continuous operation from a roll of plastic sheet material of appropriate width, which, after forming, is cut to desired length to provide individual containers.

In making single containers pursuant to the invention, flat sheet plastic material may be suitably printed individually or in multiple. The multiple printed sheets would be cut apart. The individual sheet is formed over a mandrel of desired diameter or shape, the sheet being of such size that an excess of material extends beyond the line of meeting around the mandrel to form tabs or flaps. At the line of meeting around the mandrel, the two contiguous layers of material may be joined by heat sealing or with a suitable adhesive or solvent.

When making containers in multiple, the same process is followed as described above, except for use of a longer strip of material and a corresponding length of mandrel.

In a continuous process, the appropriate width of film may be supplied from a roll and fed to a mandrel where it would be joined at the line of meeting around the mandrel. The individual containers would be cut to desired length after the continuously formed tube moved along or off of the discharge end of the mandrel.

Means for closing opposite ends of the container may comprise plugs or caps to be inserted into opposite end openings of the tube. The caps may be permanently secured by heat, adhesive or solvent, or arranged for friction fit. Or one end opening may be closed by crimping with heat, adhesive or solvent and the opposite end closed with a friction fit plug.

Examples of practical devices embodying the invention are described below and in the accompanying drawings; the invention is not limited thereto, but covers all other forms coming within the scope or purview of the disclosure herein.

In the drawings:

FIG. 1 is a schematic view, for illustrative purposes only, of a method which may be used in carrying out the invention, the invention being adapted to be practiced with other equipment, as will become apparent from the disclosure herein, FIG. 2 is an enlarged, schematic view, showing a means which may be used for closing the remaining portions of the sheet after forming the container, to provide a tab extending therefrom, FIG. 3 is a perspective view of a container and extended tab embodying the invention, showing also end caps which may be inserted into the longitudinal ends of the container to close the same, FIG. 4 is a similar view of a double form of container with the tab formed medially pursuant to the invention, caps being shown inserted in the longitudinal ends of the so formed containers, FIG. 5 shows a container and tab embodying another cross sectional form of the invention, FIG. 6 is a plan view of a container and tab embodying the invention, one end of the container being shown flattened and closed, the other end being open and adapted to have an end cap inserted therein, FIG. 7 is a schematic, sectional view, showing that the flat sheet of material from which the container and tab may be made in any of the forms, may be a plurality of laminations, one layer being preprinted and another layer or protective layers secured thereto, FIG. 8 is a fragmentary, schematic, perspective view illustrating a method of forming a plurality of containers from a single sheet of a width in multiples of that desired for the single container and tab, FIG. 9 illustrates the manner in which said multiple width sheet is cut to widths suitable for forming individual container and tab units, and FIG. 10 is a similar perspective view of the multiple sheet of FIG. 8 shown performed to provide a multiple of connected container and tab units which may be cut to define the individual units shown in perspective in FIG. 11.

As shown in the drawings (FIGS. 3–6) a unitary container 10 and tab are formed, pursuant to the invention, from a flat sheet of material which may be initially in the form of a roll 12 mounted on a suitable support 13. The sheet of material 14 is taken off the roll by suitable means, as by passing said sheet between rollers 15, 16 or other advance, guide means to a printing station having a die 17 for printing the indicia 18 to be displayed on the tab 11. Sheet 14 may be supported at that station on a table 18, passing thence through guide means such as rollers 19 across a table 20 and an anvil 21, where said sheet may be cut by a knife 22.

The remaining portions 30, 31 of the container sheet 14 may be secured together by means such as a suitable adhesive which may (FIG. 1) be applied to the sheet 14 from a reservoir 43 or otherwise applied to the sheet at a point spaced from the cutting station 21–22 at the desired point for effecting the subsequent adhesive sealing of the portions 30, 31 of the sheet. The sheet 14, passing beyond said cutting station next encounters the deflecting roller 25 (FIG. 2) and the arcuate face 27 of forming bracket 26 cooperating with a further forming roller 28 to form the container 10 of the cross section desired. The foregoing or other suitable apparatus may be used in carrying out the invention, for bending a portion 29 (FIG. 1) of the sheet intermediate its ends into the cross sectional form of container and tab desired. For example, if it is desired that the container have the non-circular form 10′ shown in FIG. 5, suitable forming or bending apparatus would be used to form the portion 29′ (FIG. 5) intermediate the ends of the sheet into the cross sectional form of container desired, with the remaining portions of said sheet (30, 31 in FIG. 3, 30′, 31′ in FIG. 5) adjacently extended from the so-formed container closed to thus close the container cross sectionally and define the tab, FIG. 3, extended therefrom. Said remaining portions may be closed by any suitable means, such as, where the sheet 14 is a thermoplastic material, by members 32, 33 to urge said remaining portions together under heat and pressure, thus sealing them and closing the container axially. The thus formed tab 11 may (FIG. 3) consist of a short remaining portion 30 secured to a longer remaining portion 31 of the sheet, the latter having the indicia 18 preprinted thereon as above mentioned; said remaining portions 30, 31 may be formed of equal length. As shown in FIG. 4, two portions of the sheet intermediate its ends may be formed into the cross sectional form of the containers desired, the remaining portions of said sheet adjacently extended from so-formed containers being secured to close the containers cross sectionally. Thus tab 11 is disposed intermediate the first container 10 and second container 34 so formed; the first and second remaining portions 30, 23 of the sheet being secured to the tab portion 31.

The sheet 14 may be laminated of two or more layers (FIGS. 6, 7) one layer 14' being so preprinted with the indicia 18 and another protective layer 14" secured thereto or the indicia 18 may be printed on both faces of the layer 14' and a second protective layer 14''' secured to the opposite face thereof.

The container and tab may be formed in an essentially continuous operation by use of suitable equipment designed for that purpose, the anvil and knife 21, 22 and moistener 43 and the parts for forming the container 10 shown in FIG. 2 moving with the movement of the sheet 14 to perform their operations and then returning to repeat the cycles.

From the foregoing it will be noted that, pursuant to the invention, the unitary container and tab are formed of a flat sheet of material formed transversely intermediate its ends to define an elongated tubular container with portions of the sheet inwardly of the transverse ends thereof extended from the container and secured together to define a tab preprinted with indicia thus displayed in flat form adjacent the container.

The longitudinal ends 35, 36 (FIG. 3) of the container 10 may be formed open and closure caps 37, 38 removably secured thereto, said caps having larger outer portions and inner depending portions (39, FIG. 3) of the diameter or form of the open ends 35, 36. The sheet 14 of any of the forms may comprise a layer 14' (FIG. 7) made of opaque material preprinted with contrasting indicia if desired; layers 14", 14''' may be transparent or translucent and heat sealed or otherwise secured thereto so that said laminations will constitute the sheet.

One of any of the longitudinal ends of the container may be flattened and closed as shown at 40 in FIG. 6 by an adhesive or by application of heat and pressure or other sealing means desired. Tab 11 of any of the embodiments may be perforated as shown at 41 in FIG. 6 adjacent the container to facilitate separating the same therefrom and the tab 11 may be apertured as shown at 42 so that the entire unit may be conveniently held or displayed.

The container 10 and tab may be formed singly around a mandrel 44 (FIGS. 1 and 2) of the desired cross section or in multiple units by forming the sheet 14 of multiple width (FIGS. 8 and 10) then cut to the width required for forming the individual containers and tabs, as shown at 45, 46 and 47, FIG. 9. Said individual sheets 45, 46, 47 would then correspond with the sheet 14 cut as at 21, 22 in FIG. 1 and may be individually formed around mandrels, by use of suitable equipment, to the desired container and tab form. A group of containers and tabs may be unitarily formed as shown in FIG. 10 and then cut as at 49 and 50 to form the individual containers and tabs shown in FIG. 11. The container and tab of the invention are adapted for holding and displaying articles in a sanitary, attractive and effective manner, convenient for use, with appropriate indicia displayed on the tab extended from the container. Both ends of the container may, if desired, be permanently closed in a fashion corresponding with that indicated for end 40 (FIG. 6) or in any other desired or convenient manner.

We claim:

1. A unitary double container and tab device of a sheet of material, said sheet being formed intermediate its ends into an elongated tubular device, means closing the ends of said device to form one container with portions of said sheet extended from the tubular device and end and intermediate portions secured together to define a tab, said tab extending at an angle to the portion defining the elongated tubular device, parts of which diverge both ways from the plane thereof, and carrying indicia to be displayed thereon in flat form adjacent said tubular device, said sheet beyond said tab having its end portion secured to an intermediate portion to define another elongated tubular device spaced from the first-mentioned device by said tab, and means closing the ends of said other device to form another container.

2. A unitary double container as defined in claim 1 wherein the sheet of material is plastic.

3. A unitary double container as defined in claim 1, wherein the sheet material is laminated, with the preprinted tab portion opaque and the other portions transparent and protectively secured to opposite faces thereof.

References Cited in the file of this patent

UNITED STATES PATENTS

| | | |
|---|---|---|
| 878,437 | Volger | Feb. 4, 1908 |
| 1,072,914 | Comings | Sept. 9, 1913 |
| 1,185,880 | Cooper | June 6, 1916 |
| 1,269,169 | Farley | June 11, 1918 |
| 1,490,801 | Collins | Apr. 15, 1924 |
| 1,698,072 | Russell | Jan. 8, 1929 |
| 1,713,129 | Hope | May 14, 1929 |
| 2,220,927 | Zalkind | Nov. 12, 1940 |
| 2,275,761 | Hoffman | Mar. 10, 1942 |
| 2,659,614 | Cook et al. | Nov. 17, 1953 |
| 2,711,982 | Straka | June 28, 1955 |
| 2,720,964 | Hopper | Oct. 18, 1955 |
| 2,766,160 | Benton | Oct. 9, 1956 |
| 2,801,198 | Morris | July 30, 1957 |

FOREIGN PATENTS

| | | |
|---|---|---|
| 797,404 | France | Feb. 8, 1936 |